US009835210B2

(12) United States Patent
Cho et al.

(10) Patent No.: US 9,835,210 B2
(45) Date of Patent: Dec. 5, 2017

(54) APPARATUS AND METHOD FOR LEARNING CLUTCH TORQUE OF DUAL CLUTCH TRANSMISSION

(71) Applicants: Hyundai Motor Company, Seoul (KR); Kia Motors Corporation, Seoul (KR)

(72) Inventors: Sung Hyun Cho, Gyeonggi-do (KR); Hwan Hur, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 99 days.

(21) Appl. No.: 14/937,249

(22) Filed: Nov. 10, 2015

(65) Prior Publication Data

US 2016/0377129 A1  Dec. 29, 2016

(30) Foreign Application Priority Data

Jun. 26, 2015  (KR) .................. 10-2015-0091360

(51) Int. Cl.
*F16D 48/06* (2006.01)
(52) U.S. Cl.
CPC ...... *F16D 48/068* (2013.01); *F16D 2500/106* (2013.01); *F16D 2500/10412* (2013.01);
(Continued)
(58) Field of Classification Search
CPC ........... F16D 48/06; F16D 2500/30406; F16D 2500/30417; F16D 2500/30428; F16D 2500/3068; F16D 2500/30818
See application file for complete search history.

(56) References Cited

U.S. PATENT DOCUMENTS 6,658,340 B2 * 12/2003 Serra .................. B60W 10/02
701/63
7,025,708 B2 *  4/2006 Rieger .................. F16D 48/06
477/171
(Continued)

FOREIGN PATENT DOCUMENTS

JP  H05296332 A  11/1993
JP  2008275036 A  11/2008
(Continued)

OTHER PUBLICATIONS

Machine translation of JP 2013079707A from Espacenet, downloaded Mar. 22, 2017.*

*Primary Examiner* — Ramya Burgess
*Assistant Examiner* — David Morris
(74) *Attorney, Agent, or Firm* — Brinks Gilson & Lione

(57) ABSTRACT

An apparatus and method of using the apparatus for learning a clutch torque of a Dual Clutch Transmission (DCT) includes judging whether shifting begins, controlling torque transmission of a coupling-side clutch and a release-side clutch to cross each other while following a coupling-side target clutch torque when shifting begins, and calculating and storing a learning value, after the controlling has begun, using a function determined by the relationship between an average value of an engine angular acceleration and a coupling-side shifter input-shaft angular acceleration, engine rotation inertia, and a torque compensated to the torque transmission of the coupling-side clutch for reducing a slippage of the release-side clutch by feedback control during a torque handover interval.

18 Claims, 3 Drawing Sheets

(52) U.S. Cl.
CPC ........... *F16D 2500/3067* (2013.01); *F16D 2500/3068* (2013.01); *F16D 2500/30406* (2013.01); *F16D 2500/30417* (2013.01); *F16D 2500/30428* (2013.01); *F16D 2500/30818* (2013.01); *F16D 2500/50251* (2013.01); *Y02T 10/76* (2013.01)

(56) References Cited

U.S. PATENT DOCUMENTS

| | | | | |
|---|---|---|---|---|
| 7,169,082 | B2* | 1/2007 | Rieger | F16D 48/06 477/171 |
| 7,985,163 | B2* | 7/2011 | Jiang | F16D 48/06 192/103 C |
| 8,996,266 | B2* | 3/2015 | Hultengren | F16D 13/00 477/166 |
| 9,051,975 | B2* | 6/2015 | Arai | F16H 61/688 |
| 9,334,953 | B2* | 5/2016 | Kurata | F16D 48/06 |
| 2016/0123465 | A1* | 5/2016 | Cho | F16H 63/46 477/176 |
| 2016/0159343 | A1* | 6/2016 | Hata | B60K 6/387 477/5 |

FOREIGN PATENT DOCUMENTS

| | | |
|---|---|---|
| JP | 2011-161982 A | 8/2011 |
| JP | 2011173519 A | 9/2011 |
| JP | 2013-079707 A | 5/2013 |
| JP | 2014-040821 A | 3/2014 |
| KR | 10-1382289 B1 | 4/2014 |
| KR | 2014-0055190 A | 5/2014 |
| KR | 2015-0011482 A | 2/2015 |

* cited by examiner

APPARATUS AND METHOD FOR LEARNING CLUTCH TORQUE OF DUAL CLUTCH TRANSMISSION

CROSS-REFERENCE TO RELATED APPLICATION

This application claims the benefit of Korean Patent Application No. 10-2015-0091360, filed Jun. 26, 2015, the entirety of which is hereby incorporated by reference.

FIELD

The present disclosure relates to a method and apparatus for learning a clutch torque of a Dual Clutch Transmission (DCT).

BACKGROUND

The statements in this section merely provide background information related to the present disclosure and may not constitute prior art Generally, an Automatic Transmission (A/T) performs learning in order to correct deviations with respect to a hydraulic solenoid while shifting. The major purpose of this learning is to correct hardware deviations of the hydraulic solenoid. However, such learning is performed with the purpose of correcting hardware deviations within any range because most hydraulic solenoids have somewhat consistent u-V (friction depending on the relative speed).

Meanwhile, a Dual Clutch Transmission (DCT) is an automated manual transmission based on a manual shifting mechanism, and transmits a torque (power) transmitted from an engine to wheels using the characteristics of a dry clutch.

In a typical DCT shifting control characteristics vary according to the accuracy with which the torque supplied by the engine is transmitted to the wheels by way of a drive shaft. A satisfactory shifting sensation may be realized via accurate control of the dry clutch.

Thus, although the DCT needs to be precisely controlled via the learning of the dry clutch in order to improve the shifting sensation, the dry clutch does not undergo or exhibit hardware deviation in the same manner as a hydraulic solenoid. Therefore, in order to predict the characteristics of the dry clutch, it is necessary to perform touch point learning and Torque-Speed (T-S) curve shape prediction learning at ordinary times.

For example, a T-S curve shape and a touch point of a clutch actuator may be predicted using data such as the coupling-side target clutch torque, engine operating conditions, and clutch rotation speed.

However, it is difficult to perfectly predict variation in engine rotation inertia and drag characteristics when investigating the touch point no matter how frequently learning is performed. In addition, the T-S curve shape is predicted under the assumption that the engine torque is somewhat consistent, and contains uncertainty due to the inconsistency of the engine torque, which may deteriorate the shifting sensation.

SUMMARY

The present disclosure provides an apparatus and method for learning a clutch torque of a DCT, which improves a shifting sensation by performing learning for a coupling-side clutch torque during shifting.

According to one aspect of the present disclosure, a method for learning a clutch torque of a Dual Clutch Transmission (DCT) is provided. The method may include judging whether shifting begins, controlling torque transmission of a coupling-side clutch and a release-side clutch to cross each other while following a coupling-side target clutch torque when shifting begins, and detecting and storing a learning value, after the controlling has begun, using a function determined by the relationship between an average value of an engine angular acceleration and a coupling-side shifter input-shaft angular acceleration, engine rotation inertia, and a torque compensated by slip control of the coupling-side clutch.

The judging may include judging whether power-on shifting begins.

The detecting may be performed from a time at which the controlling ends to a time at which a coupling-side clutch torque and an engine torque are the same as each other.

The detecting may be performed from a time at which coupling of the release-side clutch is completely released to a time at which a coupling-side clutch torque and an engine torque are the same as each other.

The detecting may include detecting the learning value by adding the torque compensated by the slip control of the coupling-side clutch to a value acquired by multiplying the engine rotation inertia by the average value of the engine angular acceleration and the coupling-side shifter input-shaft angular acceleration.

The detecting may include detecting the learning value on a per shift-stage basis.

After the detecting, the detected learning value is reflected to compensate for the coupling-side target clutch torque.

The method may further include, between the controlling and the detecting, judging whether a driving state of a vehicle or a current shifting state corresponds to a learning prohibition condition.

The judging the learning prohibition condition may include judging whether current shifting is consecutive shifting between adjacent shift-stages.

The judging the learning prohibition condition may include judging whether preceding shifting is downshifting and whether a lapsed time duration from a time at which the downshifting is completed to a time at which current upshifting begins is shorter than a reference value.

The judging the learning prohibition condition may include judging whether another shifting begins during current shifting.

The judging the learning prohibition condition may include judging whether current shifting is shifting based on Accelerator Position Sensor (APS) opening/closing switching.

The judging the learning prohibition condition may include judging whether current shifting is first shifting after ignition starts.

The judging the learning prohibition condition may include judging whether an APS error occurs.

The judging the learning prohibition condition may include judging whether a driving state of a vehicle is upshifting in a hold mode or manual mode, or is upshifting in a shift pattern restriction state.

The judging the learning prohibition condition may include judging at least one of whether an engine RPM is below a set value, whether an APS opening rate is below a set value, whether variation in the angular acceleration of a coupling-side shifter input-shaft is below a set value, whether an operating state of an air conditioner is changed during current shifting, whether variation in measurement of a Throttle Position Sensor (TPS) during current shifting is a set value or more, whether variation in measurement of an APS during current shifting is a set value or more, whether variation in engine torque during current shifting exceeds a set value and a run-up amount is a set value or less, and whether increase in vehicle speed is a set value or more.

The judging the learning prohibition condition may include judging current shifting is shifting from a first stage to a second stage and a gradient of a vehicle falls outside of a set range.

The judging the learning prohibition condition may include judging variation in engine torque occurs by a request of an Electronic Stability Program (ESP).

According to another aspect of the present disclosure, an apparatus for learning a clutch torque of a DCT is provided. The apparatus may include a judgment unit configured to judge whether shifting begins, a controller configured to control torque transmission of a coupling-side clutch and a release-side clutch to cross each other while following a coupling-side target clutch torque when shifting begins, and a detection unit configured to detect a learning value, after the cross-control has begun, using a function determined by the relationship between an average value of an engine angular acceleration and a coupling-side shifter input-shaft angular acceleration, engine rotation inertia, and a torque compensated by slip control of the coupling-side clutch.

Further areas of applicability will become apparent form the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
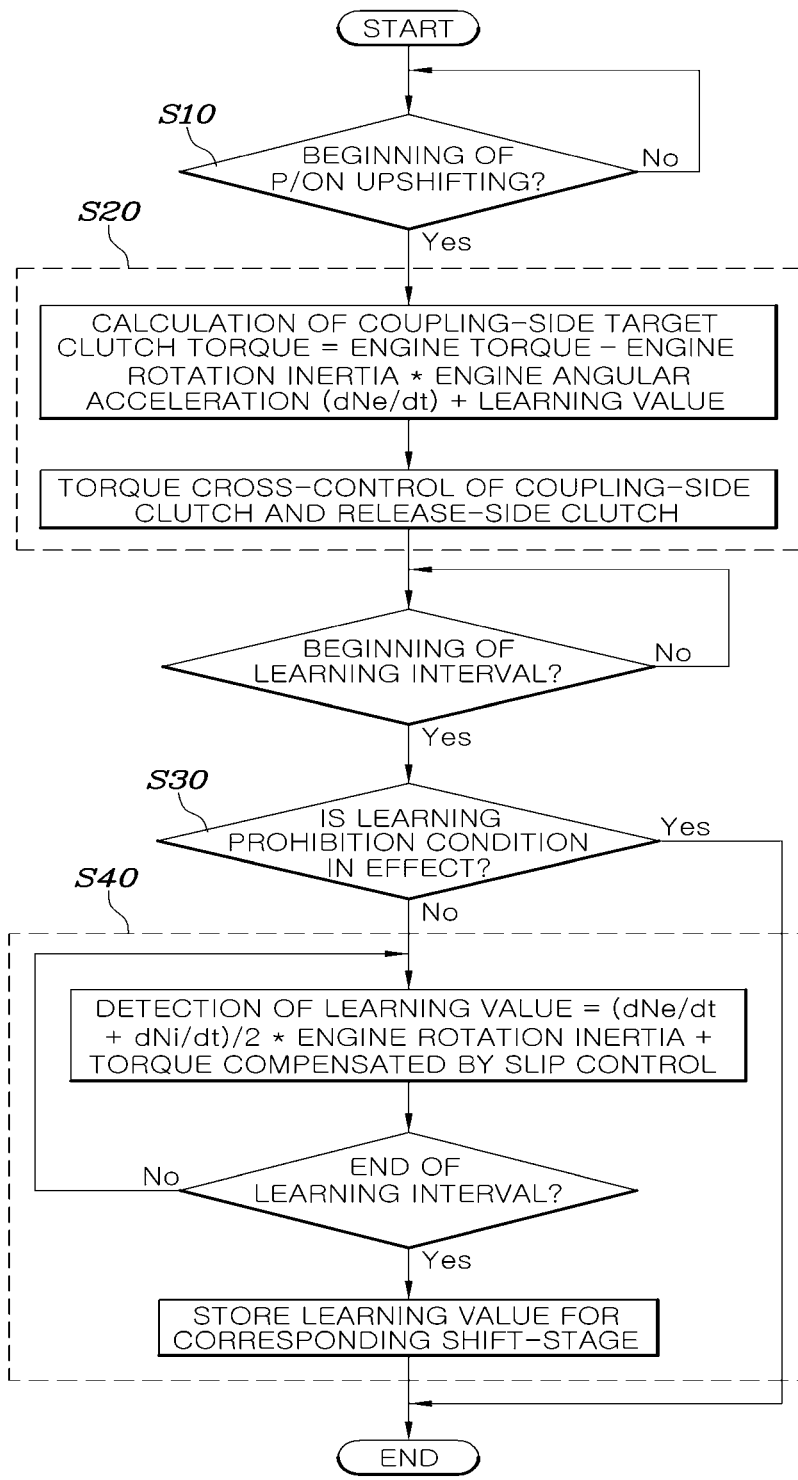
FIG. 1 is a flowchart illustrating the control flow of a method for learning a clutch torque of a DCT according to one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

A method for learning a clutch torque of a DCT according to one form of the present disclosure may include a judgment step S10, a cross-control step S20, and a learning step S40.

As illustrated in FIG. 1, the judgment step S10 may include judging whether a vehicle is currently beginning to shift.

For example, whether the vehicle begins power-on upshifting may be judged, and when it is judged that power-on upshifting has begun, control for detection of a learning value may successively be performed.

Here, "power-on upshifting" means shifting in which upward shifting is implemented by a set shift pattern when a driver steps on an accelerator.

In the cross-control step S20, handover control may be implemented to perform the corresponding shifting such that the torque transmission of a coupling-side clutch and a release-side clutch cross each other while following a coupling-side target clutch torque when shifting begins.

For example, the coupling-side target clutch torque may be calculated by the following Equation 1.

Coupling-side target clutch torque ($Tc$)=Engine torque ($Te$)−Engine rotation inertia ($Je$)*Engine angular acceleration ($dNe/dt$)+Learning value      Equation 1:

At this time, the learning value is a learning value that is detected and stored in the learning step S40 to be described below, and may be detected for each shift-stage on the basis of the shift-stage that is being shifted to. As such, the learning value may be controlled to compensate for the coupling-side target clutch torque only when shifting to the shift-stage corresponding to the detected learning value is implemented.

In the learning step S40, which is performed after the cross-control step S20 has begun, the learning value may be detected and stored using a function which is determined by the relationship between the average value of the engine angular acceleration and the coupling-side shifter input-shaft angular acceleration, the engine rotation inertia, and the torque compensated by the slip control of the coupling-side clutch.

For example, the learning value may be calculated and detected by the following Equation 2.

Learning value={(Engine angular acceleration ($dNe/dt$)+Coupling-side shifter input-shaft angular acceleration ($dNi/dt$))/2}*Engine rotation inertia ($Je$)+Torque compensated by slip control      Equation 2:

That is, the learning value may be detected by adding the torque compensated by the slip control of the coupling-side clutch to a value acquired by multiplying the engine rotation inertia by the average value of the engine angular acceleration and the coupling-side shifter input-shaft angular acceleration.

At this time, the expression "torque compensated by the slip control" means the torque acquired via the compensation of the coupling-side clutch by feedback control when slippage of the coupling-side clutch occurs during the torque handover interval.

Figure 2:
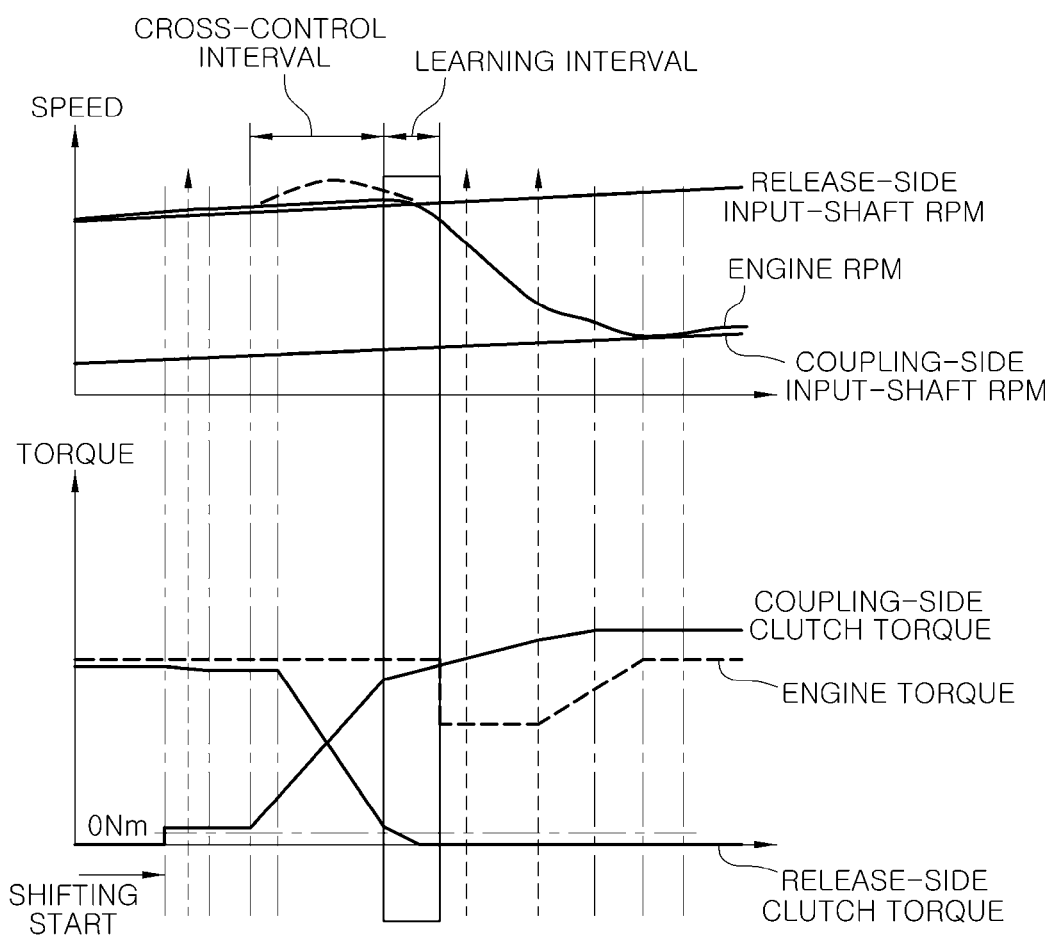
FIG. 2 is an explanatory graph illustrating variation in clutch torque in a DCT shifting process and a learning interval according to one form of the present disclosure.

In addition, the learning step S40, as illustrated in FIG. 2, may be performed from the time at which the cross-control S20 ends to the time at which the coupling-side clutch torque and the engine torque are the same as each other.

In addition, the learning step S40 may be performed from the time at which the coupling of the release-side clutch is completely released to the time at which the coupling-side clutch torque and the engine torque are the same as each other.

Here, in the learning step S40, the learning value may be detected on a per shift-stage basis.

Thereby, after the learning step S40, the detected learning value may be controlled to compensate for the coupling-side target clutch torque.

For example, when a leaning value is detected in the power-on upshifting process in which shifting from the second stage to the third stage is implemented, the detected learning value is stored. Thereafter, the learning value is reflected to compensate for the clutch torque that will be applied for shifting from the second stage to the third stage, so as to determine the target clutch torque.

Meanwhile, a method of the present disclosure may further include, between the cross-control step S20 and the learning step S40, a learning prohibition judgment step S30 that includes judging whether the driving state of the vehicle or the current shifting state corresponds to a learning prohibition condition.

In the learning prohibition judgment step S30, a determination may be made as to whether current shifting is consecutive shifting between adjacent shift-stages such as shifting from a first stage to a second stage and a second stage to a third stage.

For example, learning may be prohibited in the case where current shifting is not consecutive shifting such as shifting from a first stage to a third stage, skipping an intermediate second shift-stage.

Additionally, the learning prohibition judgment step S30, may include determining whether a preceding shift was downshifting and whether the lapsed time duration from the time at which downshifting is completed to the time at which current upshifting begins is shorter than a reference value.

That is, learning may be prohibited in the case where the lapsed time duration from the time at which preceding downshifting is completed to the time at which current upshifting begins is less than the reference value.

In addition, in the learning prohibition judgment step S30, whether another shifting begins during current shifting may be judged.

For example, learning may be prohibited in the case where another shifting begins as the driving state of the vehicle is changed before shifting of the current shift-stage is completed.

In addition, in the learning prohibition judgment step S30, whether current shifting is shifting based on Accelerator Position Sensor (APS) opening/closing switching may be judged.

For example, learning may be prohibited in the case where current shifting occurs via switching from the power-off state to the power-on state of an accelerator.

In addition, in the learning prohibition judgment step S30, whether current shifting is first shifting after ignition starts may be judged.

That is, learning may be prohibited in the case where current shifting is first shifting after ignition starts.

In addition, in the learning prohibition judgment step S30, whether an APS error occurs may be judged.

That is, learning may be prohibited in the case where, for example, an APS signal error occurs or a learning prohibition checking error occurs.

In addition, in the learning prohibition judgment step S30, whether the driving state of the vehicle is upshifting in a hold mode or manual mode or is upshifting in a shift pattern restriction state may be judged.

For example, learning may be prohibited in the case where the driving mode of the vehicle is upshifting in the hold mode or manual mode. In addition, learning may be prohibited in the case where there is a shift pattern restriction request such as, for example, upshifting delay, or where control to restrict the shift pattern is required.

In addition, in the learning prohibition judgment step S30, whether to prohibit learning may be judged based on engine RPM, APS opening rate, variation in the angular acceleration of a coupling-side shifter input-shaft, air conditioner state, variation in the measurement of a Throttle Position Sensor (TPS) variation, variation in the measurement of an APS, variation in engine torque, run-up amount, and increase in vehicle speed.

For example, learning may be prohibited in the case where the engine RPM is below a set value.

In addition, learning may be prohibited in the case where the APS opening rate is below a set value.

In addition, learning may be prohibited in the case where variation in the angular acceleration of a coupling-side shifter input-shaft is below a set value.

In addition, learning may be prohibited in the case where the operating state of the air conditioner is changed during shifting.

In addition, learning may be prohibited in the case where variation in the measurement of a TPS during shifting is a set value or more.

In addition, learning may be prohibited in the case where variation in the measurement of an APS during shifting is a set value or more.

In addition, learning may be prohibited in the case where variation in engine torque during shifting exceeds a set value and the run-up amount during shifting is a set value or less.

Finally, learning may be prohibited in the case where increase in vehicle speed is a set value or more.

In addition, in the learning prohibition judgment step S30, whether current shifting is shifting from the first stage to the second stage and the gradient of the vehicle falls outside of a set range may be judged.

That is, learning may be prohibited in the case where current shifting is shifting from the first stage to the second stage and the gradient of the vehicle falls outside of the set range.

In addition, in the learning prohibition judgment step S30, whether variation in engine torque occurs by a request of an Electronic Stability Program (ESP) may be judged.

That is, learning may be prohibited in the case where an engine torque variation request is generated from the ESP which integrally controls an Anti-lock Brake System (ABS) and a Traction Control System (TCS).

Figure 3:
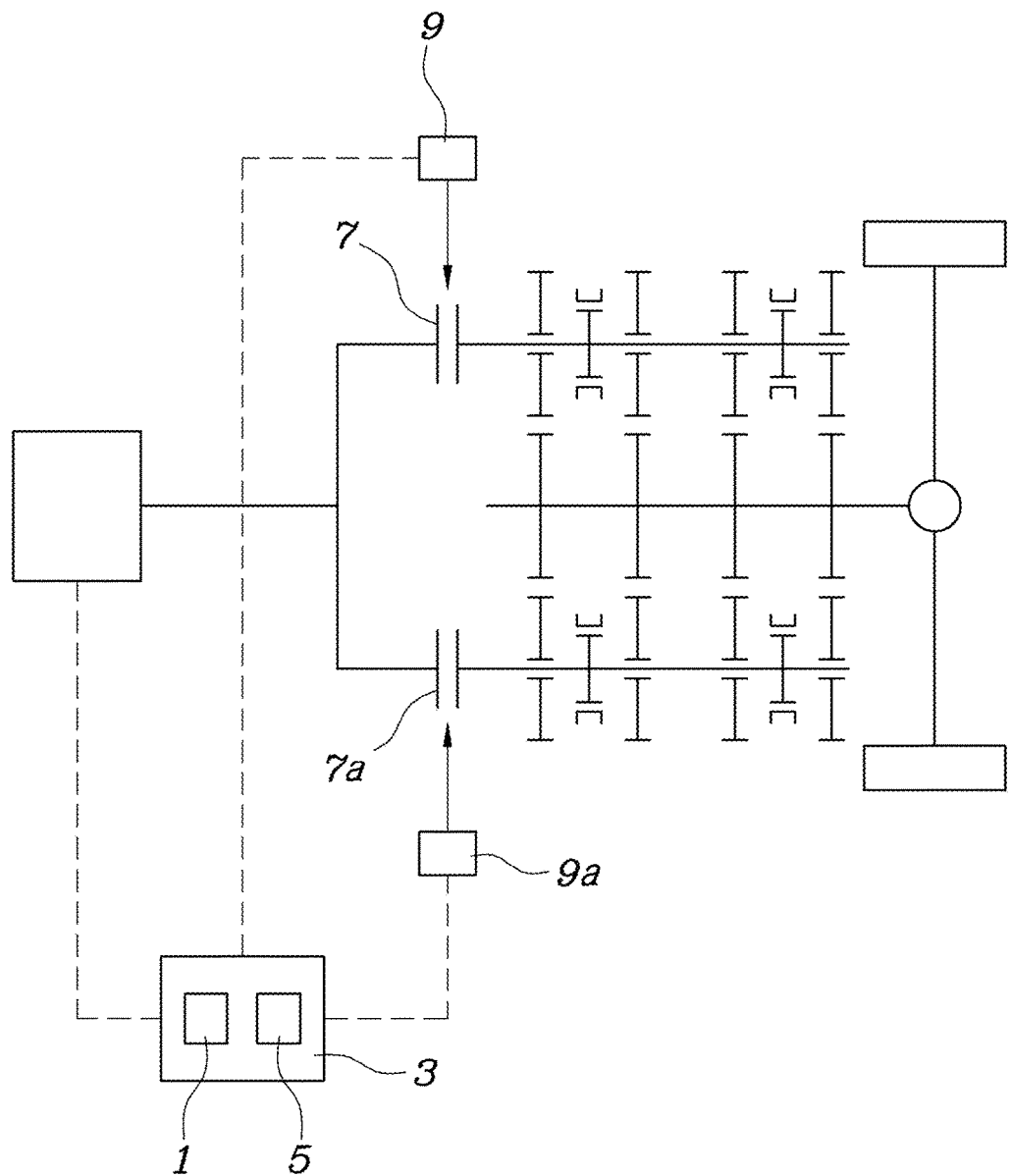
FIG. 3 is a schematic drawing illustrating the configuration of an apparatus for learning a clutch torque of a DCT according to one form of the present disclosure.

Meanwhile, as illustrated in FIG. 3, an apparatus for learning a clutch torque of a DCT according to the present invention may include a judgment unit 1, a controller 3, and a detection unit 5.

First, the judgment unit 1 may judge whether shifting begins.

The controller 3 may operate clutch actuators 9, 9a to control the torque transmission of the coupling-side clutch 7 and the release-side clutch 7a to cross each other while following the coupling-side target clutch torque when shifting begins. Specifically, when shifting begins, the controller 3 may control the clutch actuators 9, 9a to put any one of the coupling-side clutch 7 and the release-side clutch 7a in a coupled state, and put remaining one of the release-side clutch 7 and the coupling-side clutch 7 in a released state.

The detection unit 5 may detect a learning value using a function which is determined by the relationship between the average value of the engine angular acceleration and the coupling-side shifter input-shaft angular acceleration, the engine rotation inertia, and the torque compensated by the slip control of the coupling-side clutch after the cross-control has begun. The detected learning value may be stored in the controller 3, or may be stored in a separate storage unit.

Here, although the present invention illustrates and describes the judgment unit 1, the controller 3, and the detection unit 5 as being separate components, all of the control functions and operations described above may be implemented via a single controller.

Hereinafter, the control flow of the clutch torque learning method according to the present disclosure will be described with reference to FIGS. 1 and 2.

First, in the case where a vehicle shifting command is applied to begin shifting, whether the shifting is power-on upshifting may be judged.

In the case of power-on upshifting, a coupling-side target clutch torque is calculated to implement shifting via cross-control (handover control) in which the coupling-side clutch is coupled to follow the coupling-side target clutch torque and, simultaneously, the release-side clutch is separated.

At this time, in the case where a learning value corresponding to the relevant shift-stage via preceding shifting has been previously stored, the learning value may be reflected (used) to calculate the coupling-side target clutch torque.

In addition, in the case where a learning interval begins in the torque cross-control process, whether the current vehicle driving state and shifting situation is a condition in which learning is possible or a learning prohibition condition may be judged.

In the case where the judged result is that the current state does not correspond to the learning prohibition condition and learning is possible, learning may be implemented to detect a learning value until the learning interval ends, and the detected learning value may be stored in the controller 3.

Thereafter, in the case where the shifting process to a shift-stage corresponding to the detected learning value again begins, the learning value is reflected to compensate for the coupling-side target clutch torque. As such, the coupling-side clutch torque may be controlled by the compensated coupling-side target clutch torque.

As described above, the present disclosure provides an apparatus and method for learning a clutch torque of a DCT, which improves a shifting sensation for a vehicle driver, and increases clutch durability by reducing shift shock and engine RPM flare phenomena, thereby improving vehicle marketability.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method for learning a clutch torque of a Dual Clutch Transmission for a vehicle, the method comprising:
    judging whether shifting begins;
    controlling a torque transmission of a coupling-side clutch and a release-side clutch to cross each other while following a coupling-side target clutch torque when shifting begins; and
    calculating and storing a learning value, after the controlling step has begun, using a function determined by a relationship between an average value of an engine angular acceleration and a coupling-side shifter input-shaft angular acceleration, an engine rotation inertia, and a torque compensated to the torque transmission of the coupling-side clutch for reducing a slippage of the release-side clutch by feedback control during a torque handover interval,
    wherein the calculating step calculates the learning value by adding the torque compensated to the torque transmission of the coupling-side clutch to a value acquired by multiplying the engine rotation inertia by the average value of the engine angular acceleration and the coupling-side shifter input-shaft angular acceleration.

2. The method according to claim 1, wherein the judging step includes judging whether power-on shifting begins.

3. The method according to claim 1, wherein the calculating step is performed from a time at which the controlling step ends to a time at which the coupling-side clutch torque and an engine torque are equal.

4. The method according to claim 1, wherein the calculating step is performed from a time at which coupling of the release-side clutch is completely released to a time at which the coupling-side clutch torque and an engine torque are equal.

5. The method according to claim 1, wherein the calculating step includes calculating the learning value on a per shift-stage basis.

6. The method according to claim 5, wherein, after the calculating step, the calculated learning value is used to compensate for the coupling-side target clutch torque.

7. The method according to claim 1, further comprising a learning prohibition judgment step between the controlling step and the calculating step for judging whether a driving state of the vehicle or a current shifting state corresponds to a learning prohibition condition.

8. The method according to claim 7, wherein the learning prohibition judgment step includes judging whether current shifting is consecutive shifting between adjacent shift-stages.

9. The method according to claim 7, wherein the learning prohibition judgment step includes judging whether a preceding shifting is downshifting and whether a lapsed time duration from a time at which the downshifting is completed to a time at which current upshifting begins is less than a reference value.

10. The method according to claim 7, wherein the learning prohibition judgment step includes judging whether another shifting begins during current shifting.

11. The method according to claim 7, wherein the learning prohibition judgment step includes judging whether current shifting is shifting based on an Accelerator Position Sensor switching between an open position and a closed position.

12. The method according to claim 7, wherein the learning prohibition judgment step includes judging whether current shifting is first shifting after ignition starts.

13. The method according to claim 7, wherein the learning prohibition condition includes judging whether an Accelerator Position Sensor error occurs.

14. The method according to claim 7, wherein the judging the learning prohibition judgment step includes judging whether the driving state of the vehicle is upshifting in a hold mode or a manual mode, or is upshifting in a shift pattern restriction state.

15. The method according to claim 7, wherein the learning prohibition judgment step includes judging at least one of whether an engine RPM is below an engine RPM set value, whether an Accelerator Position Sensor opening rate is below an opening rate set value, whether a variation in the coupling-side shifter input-shaft angular acceleration is below an angular acceleration set value, whether an operating state of an air conditioner is changed during current shifting, whether a variation in measurement of a Throttle Position Sensor during current shifting is greater than or equal to a Throttle Position Sensor set value, whether a variation in measurement of the Accelerator Position Sensor during current shifting is greater than or equal to an Accelerator Position Sensor set value, whether a variation in the engine torque during current shifting exceeds an engine torque set value and a run-up amount is less than or equal to a run-up set value, and whether an increase in vehicle speed is greater than or equal to a vehicle speed set value.

16. The method according to claim 7, wherein the learning prohibition judgment step includes judging whether current shifting is shifting from a first stage to a second stage and whether a gradient of the vehicle falls outside of a gradient set range.

17. The method according to claim 7, wherein the learning prohibition judgment step includes judging whether a variation in engine torque occurs by a request of an Electronic Stability Program.

18. An apparatus for learning a clutch torque of a DCT, the apparatus comprising:
- a determinator configured to judge whether shifting begins;
- a controller configured to control torque transmission of a coupling-side clutch and a release-side clutch to cross each other while following a coupling-side target clutch torque when shifting begins; and
- a calculator configured to calculate a learning value, after the cross-control has begun, using a function determined by a relationship between an average value of an engine angular acceleration and a coupling-side shifter input-shaft angular acceleration, an engine rotation inertia, and a torque compensated to the torque transmission of the coupling-side clutch for reducing a slippage of the release-side clutch by feedback control during a torque handover interval, wherein the learning value is calculated by adding the torque compensated to the torque transmission of the coupling-side clutch to a value acquired by multiplying the engine rotation inertia by the average value of the engine angular acceleration and the coupling-side shifter input-shaft angular acceleration.

* * * * *